United States Patent
Gutman et al.

(10) Patent No.: US 6,206,293 B1
(45) Date of Patent: Mar. 27, 2001

(54) MAGNETICALLY COMMUNICATIVE CARD

(75) Inventors: Jose Gutman, Boynton Beach; Michael J. DeLuca, Boca Raton, both of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/982,178

(22) Filed: Dec. 1, 1997

Related U.S. Application Data

(62) Division of application No. 08/657,144, filed on Jun. 3, 1996, now Pat. No. 5,834,756.

(51) Int. Cl.$^7$ ..................................................... G06K 5/00
(52) U.S. Cl. ........................... 235/493; 235/380; 235/441
(58) Field of Search .................................. 235/492, 487, 235/486, 441, 380, 382

(56) References Cited

U.S. PATENT DOCUMENTS

| | | | | |
|---|---|---|---|---|
| 5,434,398 | * | 7/1995 | Golberg | 235/380 |
| 5,436,441 | * | 7/1995 | Inoue | 235/487 |
| 5,679,945 | * | 10/1997 | Renner et al. | 235/492 |
| 5,834,747 | * | 11/1998 | Cooper | 235/449 |
| 5,834,756 | * | 11/1998 | Gutman et al. | 235/493 |

* cited by examiner

*Primary Examiner*—Thien M. Le

(57) ABSTRACT

A magnetically communicative card (200) has a ferrite core (302) extending substantially the width (201) of the card body (203) and has a conductor (408) wound around the ferrite core for the entire length of the ferrite core. Embedded within the card body is a controller (208) that controls a varying magnetic field emanating from the conductor to mimic a varying magnetic field produced by a conventional magnetic stripe card. Optionally, the card includes a sensor to sense a signal intercepted by the conductor from a varying magnetic field emanating from another device. The controller reads the sensed signal to receive communication from the other device. A magnetically communicative card (400, 500) is alternatively flexibly attached and detachably coupled to an electronic wallet (402, 502) to produce an apparatus (405, 501). A wireless communication interface (523) is alternatively carried by the magnetically communicative card and the electronic wallet to provide wireless reconfiguration of the magnetically communicative card remotely.

15 Claims, 8 Drawing Sheets

FIG. 1 _Prior Art_

MAGNETICALLY COMMUNICATIVE CARD

This is a division of application Ser. No. 08/657,144, filed Jun. 3, 1996 now U.S. Pat. No. 5,834,756.

FIELD OF THE INVENTION

This invention relates in general to the field of data cards, and more particularly, with a data card communicative with both magnetic stripe card readers and with smartcard readers.

BACKGROUND OF THE INVENTION

A conventional prior art magnetic card reader 100, as shown in FIG. 1, typically includes a magnetic reading mechanism 102 that comprises at least one magnetic reading head 103. The magnetic card reader 100 normally includes a slotted portion 104 for inserting a magnetically readable card 106. As is well known in the art, the magnetically readable card 106 typically includes a magnetic stripe 110 which is located about an edge of the magnetically readable card 106. The magnetic stripe 110 includes at least one track 111 where information is magnetically encoded using an encoding technique that is well known in the art. As shown in FIG. 1, the magnetic stripe 110 includes three tracks of information. Correspondingly, the magnetic reading mechanism 102 includes three magnetic reading heads labeled R1, R2, and R/W3 for reading, respectively, track 1, track 2, and track 3 of the magnetically readable card 106. Additionally, the third magnetic reading head labeled R/W3 is a read/write track and comprises, in this example of prior art, a magnetic writing mechanism for writing information to track 3 of the magnetically readable card 106 in a conventional way. As is well known, a user inserts the magnetically readable card, or card, 106 in the slotted portion 104 and slides, in a direction indicated by arrow 108, the card 106 through the slotted portion 104. This swiping mechanism moves the magnetic stripe 110 of the card 106 across the magnetic reading head 103 such that the at least one track 111 of information encoded in the magnetic stripe 110 can be detected by the magnetic reading head 103 and read by the magnetic card reader 100.

The magnetic card reader 100, after reading the encoded information from the magnetic stripe 110, then typically forwards the information to another device. In the prior art example shown in FIG. 1, the magnetic card reader 100 is coupled to a central system 112, such as via a dial up telephone line 114, a dedicated line, or a computer network. In this example, the magnetic card reader 100 communicates with the central system 112 over the dial up telephone line 114, e.g., using the public switch telephone network (PSTN) by way of modem communication. The information read from the magnetic stripe 110 is then forwarded from the magnetic card reader 100 to the central system 112. The central system 112 typically comprises at least one database of information to analyze the received information from the magnetic card reader 100. The central system 112 then communicates a conclusion to the magnetic card reader 100 which, in this example, can alert the user whether the transaction with the holder of the card 106 is authorized by the central system 112.

The construction of the card 106 and of the conventional magnetic card reader 100, the techniques for magnetic encoding of information, and the format of information content for the card 106 are well known and are specified by the American National Standards Institute (ANSI), such as in ANSI standard X4.16-1983, and the more recent international standard for identification cards provided in ANSI/ISO/IEC-7811 Parts 1–5.

Although magnetically readable cards 106, i.e., magnetic stripe cards, are well accepted by users, and magnetic card readers 100 are part of a large infrastructure that is a mature and stable technology, there are a number of problems with the current use of magnetically readable cards 106 and conventional magnetic card readers 100.

First, cards 106 tend to wear out and become unreliable after repeated use. For example, the magnetic material of the magnetic stripe 110 is subject to physical damage from external hazards, degradation of its magnetic qualities over time, and it can be affected by external magnetic fields. Second, cards 106 can be easily duplicated which facilitates fraudulent use. For example, an unauthorized user can easily duplicate the information stored on the magnetic stripe 110 from a first card 106 that may have been obtained from a legal authorized user, and copy the information to a second blank card 106. The unauthorized user could then utilize the second duplicate card to engage in fraudulent transactions. Third, the card 106 typically contains a fixed amount of prerecorded magnetic information on the magnetic stripe 110. This fixed information normally corresponds to a single issuer of a card 106. In this way, users tend to carry many different cards 106 to be able to engage in transactions with different issuers of the cards 106. This tends to be cumbersome and inconvenient for a user to have to carry many different cards on their person. Fourth, the magnetic stripe 110 is of a fixed predetermined length and can store only a maximum number of bits of information, such as is specified by the ANSI standards. The amount of information that can be stored in the magnetic stripe 110, therefore, is constrained by the physical dimension of the magnetic stripe 110 and the conventional magnetic recording technique used to store the magnetically encoded information on the magnetic stripe 110. Fifth, due to the aforementioned problems with magnetic stripe card technology, there is a trend to migrate to smartcard technology. Smartcard technology typically utilizes a card with a built in controller and a group of electronic contacts arranged in a predetermined pattern on the surface of the smartcard to enable an external device, i.e., a smartcard reader, to communicate with the controller contained on the smartcard. This smartcard technology is different from the magnetic stripe card technology such that a conventional magnetic stripe card is normally not supported by a smartcard reader and a smartcard is, likewise, not supported by the vast existing stable infrastructure of the magnetic stripe card readers, i.e., conventional magnetic card readers 100. Therefore, in migrating to the more recent smartcard technology, the vast and stable magnetic stripe card reader infrastructure will become obsolete and will have to be replaced by the more recent smartcard reader and associated infrastructure. This change in card reader and infrastructure technology will be very costly to implement and probably not available at all locations right away. Therefore, those individuals carrying smartcards for some time would not have commonly available establishments with smartcard readers, thereby inconveniencing smartcard users during this transition in technology.

Thus, what is needed is a magnetically communicative card that overcomes the problems of known magnetically readable cards.

DETAILED DESCRIPTION OF THE INVENTION

Figure 2:
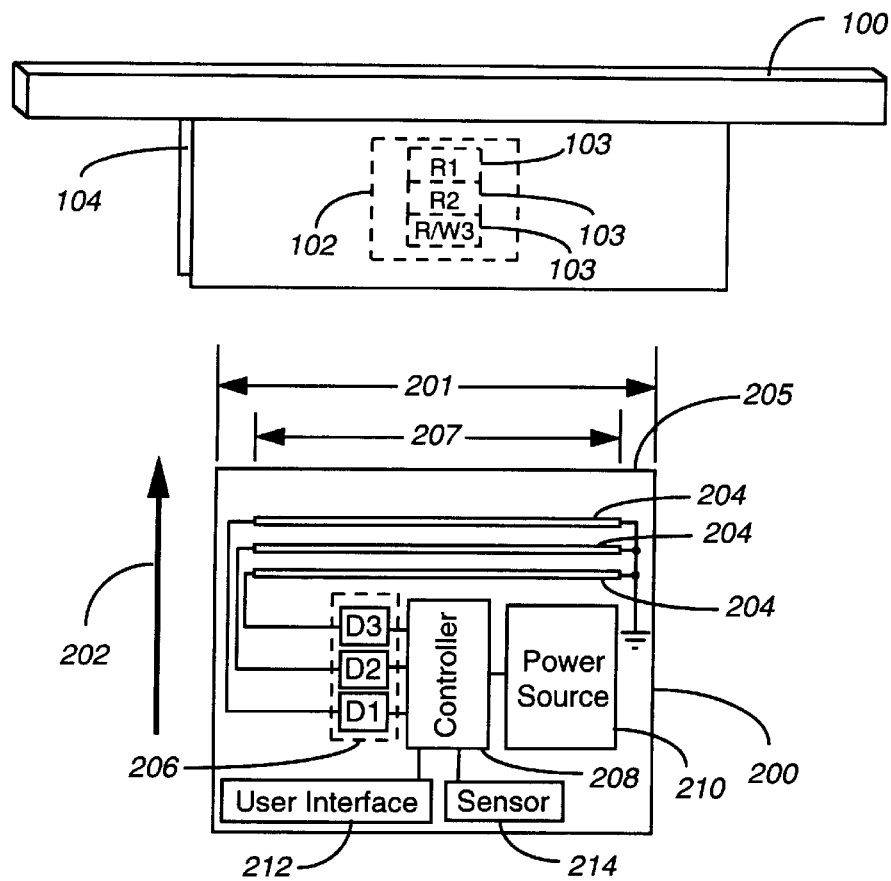
FIG. 2 is a simplified diagrammatic representation of a conventional magnetic stripe card reader and an electrical block diagram of a magnetically communicative card having three conductors in accordance with the invention.

Referring to FIG. 2, a user inserts, in a direction indicated by arrow 202, a magnetically communicative card, or card, 200 in the slotted portion 104 of the magnetic card reader 100. The card 200, which includes a card body 203 having a width 201 and a length 209, comprises at least one conductor 204 located about an edge 205 of the card 200 such that when the card 200 is inserted into the slotted portion 104 of the magnetic card reader 100, the conductor 204 corresponds to the magnetic reading head 103 of the magnetic reading mechanism 102 of the magnetic card reader 100. The conductor 204, having a length 207 that is substantially the width 201 of the card body, is electrically coupled to at least one driver circuit 206 for driving electrical signals through the conductor 204. A controller 208 is coupled to the driver circuit 206 for controlling the operation of the driver circuit 206. The controller 208, for example, can couple a data signal to the driver circuit 206. The controller 208, when coupling the data signal to the driver circuit 206, causes the driver circuit 206 to electrically drive the conductor 204 in accordance with the data signal. The electrically driven conductor 204 emits an alternating polarity magnetic field about the conductor 204 in accordance with the data signal. The alternating polarity of the magnetic field about the conductor 204 comprises magnetic flux transitions. These magnetic flux transitions can be picked up by the magnetic reading head 103 and detected by the magnetic card reader 100 to indicate bits of information corresponding to the data signal provided by the controller 208.

In accordance with the American National Standards Institute (ANSI), standard X4.16-1983, and international standard ISO/IEC 7811 Part 2, a self-clocking data signal encoding technique known as two frequency encoding is utilized in the preferred embodiment of the present invention to communicate information between the card 200 and the magnetic card reader 100. This data encoding technique comprises data and clocking flux transitions in the same signal. A magnetic flux transition occurring between clocks, signifies that the bit is a "1". The absence of a flux transition between clock transitions signifies that the bit is a "0". Magnetic flux transitions occur at the locations of the maxima of the magnitude of the magnetic flux density component normal to the surface of the card 200.

In a preferred embodiment, the controller 208 provides the data signal to operate the driver circuit 206 to selectively drive each of the at least one conductor 204 in any one of three states. First, the driver circuit 206 can forward drive a current through the conductor 204 to emit a magnetic field with a first polarity. Second, the driver circuit 206 can drive the conductor 204 with a reverse current to emit a magnetic field of a second polarity. Third, the driver circuit 206 can remain in an idle state, neither forward driving nor reverse driving the conductor 204. In this way, the controller 208 can couple a data signal to the driver circuit 206 to cause the conductor 204 to emit the alternating polarity magnetic field for providing the magnetic flux transitions to the magnetic reading head 103 of the magnetic card reader 100.

A power source 210 in the card 200 is coupled to the driver circuit 206 to provide the electrical power to electrically drive the conductor 204. Preferably, the power source 210 comprises a thin battery optionally combined with a thin super capacitor. For example, a thin solid state lithium ion battery combined with a thin super capacitor as a power source 210 provides both a long term energy storage and a high current pulse capability when necessary to drive the conductor 204 to emit the alternating polarity magnetic field.

The controller 208 is coupled to a sensor 214 for determining when the card 200 has been inserted 202 into the slotted portion 104 of the magnetic card reader 100; alternatively, the sensor is omitted. The sensor 214 comprises a contact switch located on the surface of the card 200 about an edge of the card 200 to detect when the card 200 is making contact with a surface in the slotted portion 104 of the magnetic card reader 100; alternatively, the sensor 214 comprises an optical sensor to detect a low light condition when the card 200 is inserted into the slotted portion 104. As another alternative, the sensor 214 comprises a proximity sensor to detect when the card 200 inserted 202 into the slotted portion 104 of the magnetic card reader 100 is in proximity to a surface of the slotted portion 104. Therefore, the sensor 214 can be utilized by the controller 208 to determine when the card 200 has been inserted 202 into the slotted portion 104 of the magnetic card reader 100 such that the conductor 204 is in a proximate location to the magnetic reading head 103 to communicate therebetween utilizing, in one embodiment, the alternating polarity magnetic field.

A user interface 212 such as a button, switch, or other contact sensor, is coupled to the controller to accept input from a user of the card 200. The user interface includes a user input and a user output. For example, when the user inserts the card 200 into the slotted portion 104 from the magnetic card reader 100, the user can activate a button at the user interface 212 to send a command signal to the controller 208. The command signal both informs the controller 208 that the card 200 is inserted in the slotted portion 104 and instructs the controller 208 to begin providing the data signal to the driver circuit 206 to electrically drive the conductor 204 to effect communication with the magnetic card reader 100 via the magnetic reading head 103. In the event that the card 200 comprises the sensor 214, the controller 208 can utilize a signal from the sensor 214 to affirmatively determine that the card 200 is inserted into the slotted portion 104 of the magnetic card reader 100 before electrically driving the conductor 204 in accordance with the data signal.

Additionally, the operation of a card 200 can be made secure by requiring a user to enter a predetermined combination of inputs or a password via the user interface 212 before the controller 208 can provide the data signal to operate the driver circuit 206 to effect communication with the magnetic card reader 100. For example, utilizing a single button at the user interface 212, a user is able to enter a series of dots and dashes similar to a Morse code, to unlock a combination that would then permit the card 200 to begin communicating with the magnetic card reader 100. In an alternative example, the user interface 212 comprises a set of keys (not shown) representing a keypad or keyboard, and a liquid crystal display (LCD) (not shown), that allow a user of the card 200, in response to being prompted by a message displayed on the LCD, to enter a security code or password by selectively pressing the keys. After the user enters a predetermined security code or password via the user interface 212, a magnetic communication operation of the card 200 unlocks and becomes operative, and then the user can insert the card 200 in the slotted portion 104 of the magnetic card reader 100 to begin communication. When the card 200 is inserted into the slotted portion 104, in this example, the sensor 214 provides a sensing signal to the controller 208 that then begins communication between the card 200 and the magnetic card reader 100.

Figure 3:
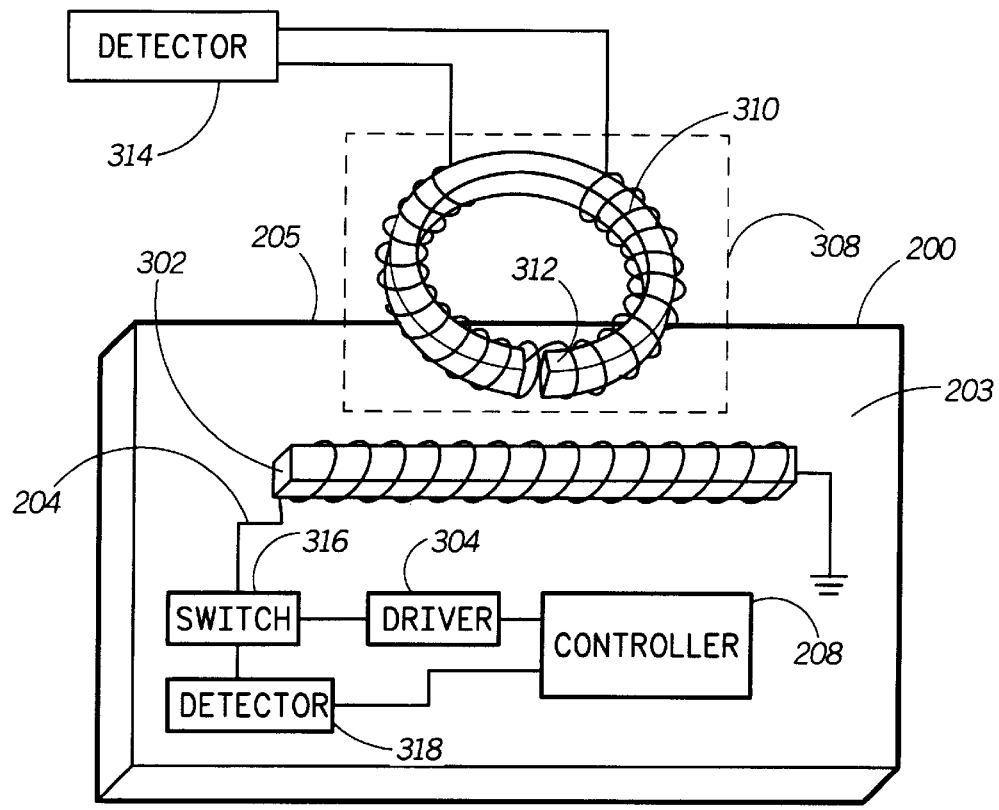
FIG. 3 is a simplified diagrammatic representation of a magnetic reading head in proximity to a magnetically communicative card having one conductor in accordance with the invention.

Referring to FIG. 3, the card 200 is shown in close proximity to a magnetic reading head 308 according to the preferred embodiment of the present invention. The controller 208 is coupled to a switch circuit 316 for selectively coupling the conductor 204 to either a driver circuit 304 or a detector circuit 318. The driver circuit 304 causes a current in the conductor 204, with changes in such current producing a magnetic field in the vicinity of the conductor. The detector circuit 318 responds to current in the conductor 204, the current changing as a result of the conductor intercepting a changing magnetic field. Although the preferred embodiment comprises the switch circuit 316 to selectively couple the conductor 204 either to the driver circuit 304 or to the detector circuit 318, an alternative embodiment has a first conductor and a second conductor with the first conductor coupled to the driver circuit 304 and the second conductor being coupled to the detector circuit 318. In this alternative arrangement, the selective switching between the driver circuit 304 and the detector circuit 318 could be implemented as an operation of the controller 208. In alternative embodiments, either the driver circuit 304 or the detector circuit 318 is omitted from the card 200, and, therefore, switch circuit 316 is not needed. For example, in a second alternative embodiment, the card 200 could include only the driver circuit 304 coupled to the conductor 204 for writing information from the card 200 to the magnetic card reader 100. In a third alternative embodiment, the card 200 includes only the detector circuit 318 coupled to the conductor 204 for reading information from the magnetic card reader 100 into the card 200.

The controller 208, in a write mode operation, activates switch circuit 316 to selectively couple the driver circuit 304 to the conductor 204. The controller 208 then couples a data signal to the driver circuit 304 to electrically drive the conductor 204 in accordance with the data signal. The driven conductor 204 emits, for example, an alternating polarity magnetic field (see FIGS. 11 and 12) to write information, preferably encoded in magnetic flux transitions, that can be detected by the magnetic card reader 100.

Figure 1:
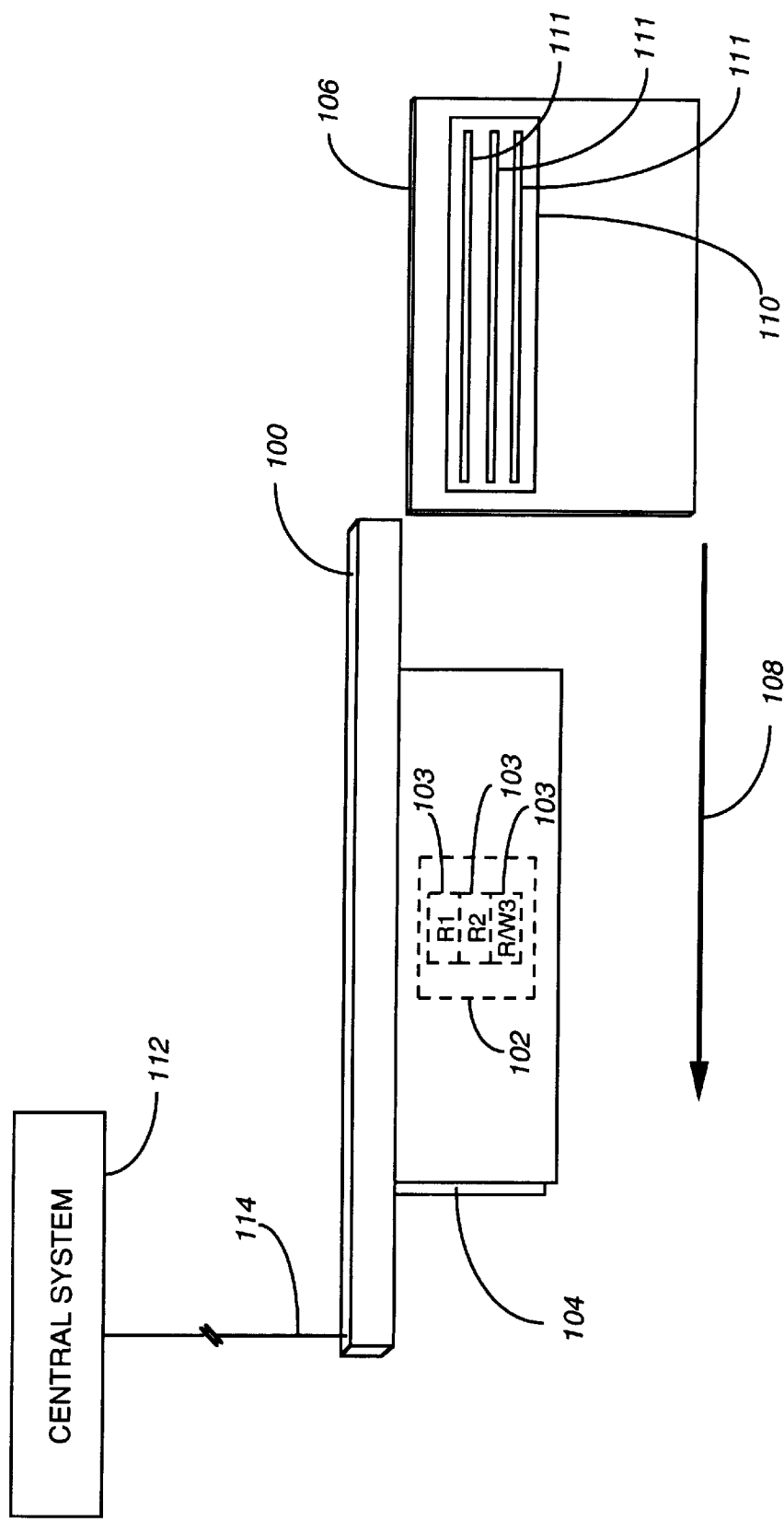
FIG. 1 is a representation of a prior art magnetic stripe card reader and a prior art magnetic stripe card.

Alternatively, in a read mode operation, such as when a magnetic card reader 100 writes information to the card 200, the controller 208 activates the switch circuit 316 to selectively couple the detector circuit 318 to the conductor 204. The detector circuit 318 in combination with the conductor 204 can detect a changing magnetic field, such as an alternating polarity magnetic field. The detector circuit 318 couples to the controller 208 a detection data signal representing, for example, a detected alternating polarity magnetic field preferably detected as a series of magnetic flux transitions, to read information emitted by a magnetic card reader, such as by a read/write head of the magnetic card reader 100 that is typically utilized for communicating information with a third track of a conventional magnetically readable card. This read mode operation, in one embodiment, would be an analogous operation to a magnetic card reader 100 writing information to a third track of a magnetic stripe 110 of a card 106 (see FIG. 1).

The card 200 as shown in FIG. 3, optionally includes the switch circuit 316 and a detector circuit 318 to allow the controller 208 to additionally detect a changing magnetic field, such as represented by magnetic flux transitions in an alternating polarity magnetic field, being picked up by the conductor 204 when the controller 208 is in a read mode. The controller 208, in this optional embodiment, is electrically coupled to the switch circuit 316 to selectively couple either the driver circuit 304 or the detector circuit 318 through the conductor 204 via the switch circuit 316. In a first mode, the controller 208, as discussed before, provides a data signal to the driver circuit 304 to electrically drive the conductor 204 to emit the exemplary alternating polarity magnetic field therefrom. In a second mode, the controller 208 is coupled to the detector circuit 318 to detect the magnetic flux transitions and thereby read a data signal from an exemplary alternating polarity magnetic field being picked up by the conductor 204. This second mode is useful to receive information from the magnetic card reader 100 in certain circumstances. For example, a conventional magnetic card reader 100 can read data and can reprogram data in track three of a conventional magnetic stripe card. This read-write process for a conventional card reader 100 is well known in the art. Therefore, in an embodiment of the present invention, the conductor 204 alternates between emitting a data signal represented as an alternating polarity magnetic field and detecting a data signal represented by an alternating polarity magnetic field that was emitted from another device, such as by the magnetic card reader 100.

Alternatively, the conductor 204 of the present invention is driven by a current that alternates by utilizing a switching means similar to that shown in figure thirteen of the Burkhardt patent, U.S. Pat. No. 4,791,283 entitled Transaction Card Magnetic Stripe Emulator issued, Dec. 13, 1988, and which is hereby fully incorporated by reference herein.

The switching means provides drive and return paths that alternately couples the driver and return paths (corresponding to the driver circuit 206 of the other embodiment of the present invention) to alternate opposite ends of the conductor 204 to cause alternating drive current pulses through the conductor to emit an alternating magnetic field from the conductor. The switching means is coupled to, and controlled by, the controller. This alternating magnetic field corresponds to the data signal being provided by the controller to the switching means (and to the driving means) in accordance with the international standard ISO/IEC 7811 Part 2 for providing a magnetically readable stripe card that is magnetically readable by a conventional magnetic card reader.

In the preferred embodiment, the conductor 204 is wound about a ferrite core 302 in the approximate shape of a coil. The conductor 204 is physically wound about the ferrite core 302. Alternatively, a printed circuit or similar technique, is used to add the conductor 204 with windings about the ferrite core 302 to the card 200.

The conductor 204 is located in the card 200 to correspond to the location of the magnetic reading head 308 when the card 200 has been inserted into the slotted portion 104 of the magnetic card reader 100 (see FIG. 2).

The magnetic reading head 308 of a magnetic card reader 100 typically comprises a pickup coil 310 wound about a ferrite core 312. The pickup coil 310 is electrically coupled to a detector circuit 314 in the magnetic card reader 100 to detect, for example, the magnetic flux transitions of the changing magnetic field emitted by the conductor 204 when driven in accordance with the data signal. The magnetic flux transitions of the changing magnetic field emitted by the conductor 204 when driven in accordance with the data signal mimic the changing magnetic field emitted by a conventional prior art magnetic stripe encoded with data corresponding to the data signal. The magnetic card reader 100 thereby reads a representation of the data signal from the card 200 as if the data signal originated from a conventional prior art magnetic stripe card.

In an alternative embodiment, the conductor 204 is a straight conductor without the windings about the ferrite core 302. The alternating polarity magnetic field emitted from the conductor 204 is picked up by the pickup coil 310 such that in the preferred embodiment the magnetic flux transitions are detected by the detector circuit 314 of the magnetic card reader 100.

Figure 4:
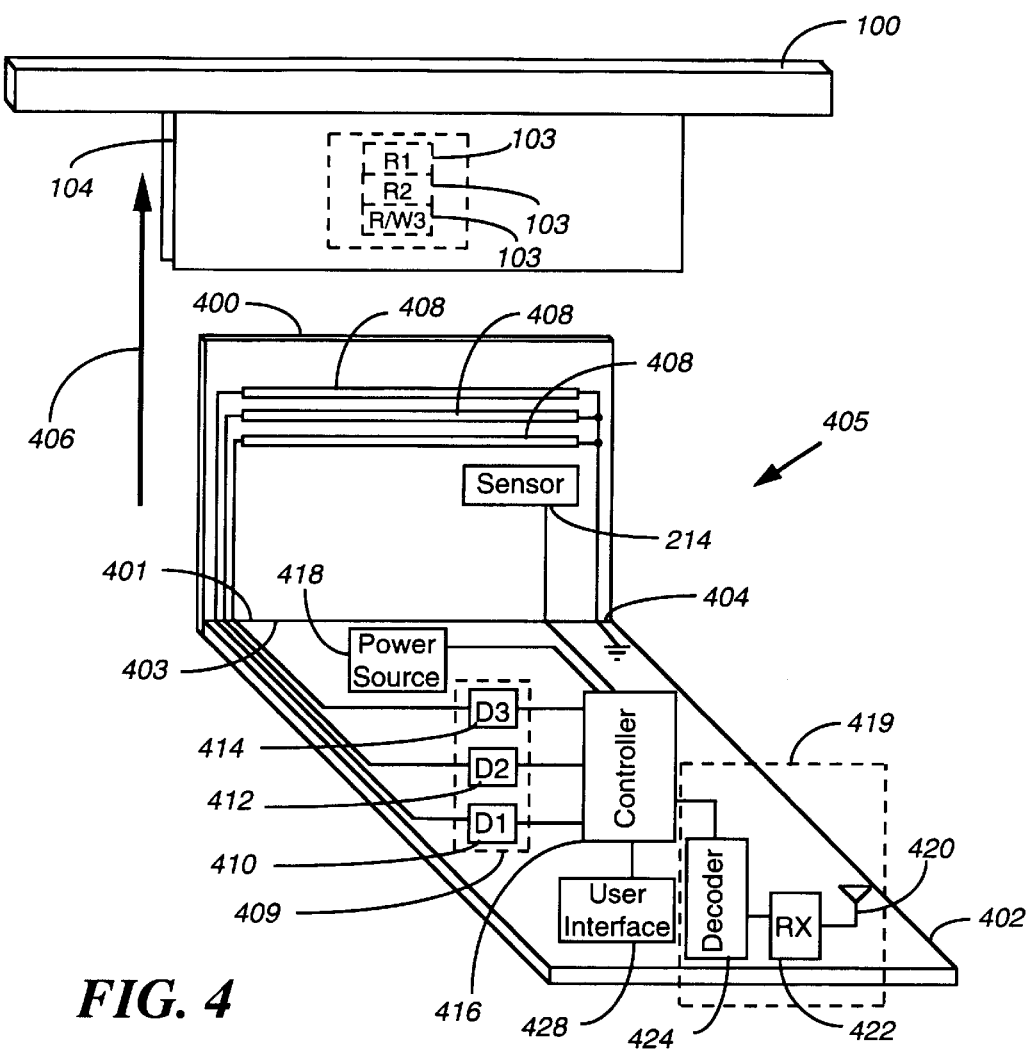
FIG. 4 is a perspective diagrammatic representation of the magnetically communicative card flexibly attached to an electronic wallet.

Referring to FIG. 4, a magnetically communicative card, or card, 400 is flexibly coupled about an edge 401 thereof with an edge 403 of an electronic wallet 402, thereby forming an apparatus 405, in accordance with a first alternative embodiment of the present invention. The electronic wallet 402 is described in U.S. Pat. No. 5,221,838 entitled Electronic Wallet, issued, Jun. 22, 1993, to Gutman, et al., which is hereby fully incorporated herein by reference. A flexible coupling means 404 about the edge of the card 400 preferably comprises a flexible material and a flex circuit to allow the card 400 to be rotated or generally moved about the edge of the electronic wallet 402 while remaining coupled, as shown in FIG. 4, to the electronic wallet 402, such as in a hinge-like fashion. In this embodiment, the card 400 comprises at least one conductor 408, and the sensor 214 that operates as has been discussed with respect to FIG. 2. The conductor 408 is electronically coupled to at least one driver circuit 409 located in the electronic wallet 402. In one embodiment, for example, a first driver circuit 410 is electrically coupled to a first of the at least one conductor 408, a second driver circuit 412 is electrically coupled to a second of the at least one conductor 408, and a third driver circuit 414 is electrically coupled to a third of the at least one conductor 408. In this exemplary embodiment, the first conductor, the second conductor, and the third conductor, of the at least one conductor 408, corresponds to a first reading head, a second reading head, and a third reading/writing head of a magnetic card reader 100. The first conductor, the second conductor, and the third conductor, can be operated by the card 400 to communicate information bi-directionally with the magnetic card reader 100. This bi-directional communication is in a manner analogous to the swiping action of a conventional magnetic stripe card across the first reading head, the second reading head, and the third reading/writing head of the magnetic card reader 100, where the magnetic stripe comprises a first track, a second track, and a third track of information for communication with the magnetic card reader 100.

A controller 416 in the electronic wallet 402 is electronically coupled to the at least one driver circuit 409 for controlling the operation of the driver circuit 409. For example, the controller 416 can provide a data signal to the driver circuit 409, and, in response to receiving the data signal, the driver circuit 409 electrically drives the conductor 408 in accordance with the data signal. In response to being electronically driven, the conductor 408 preferably emits an alternating polarity magnetic field. When the card 400 has been inserted, in a direction indicated by arrow 406, into the slotted portion 104 of the magnetic card reader 100, the alternating polarity magnetic field can be detected by the magnetic reading head 103 of the magnetic card reader 100. The bidirectional communication process of the card 400 and the magnetic card reader 100 has been discussed with respect to FIG. 3 such as by detecting magnetic flux transitions to indicate bits of information that represent a "1" or a "0" value. Also, as has been discussed hereinabove with respect to the sensor 214, the card 400 that optionally includes the sensor 214 can detect when the card 400 has been inserted 406 into the slotted portion 104 of the magnetic card reader to affirmatively determine when communication between the card 400 and the magnetic reading head 103 can take place.

It should be understood that the flex circuit, preferably constituting a hinge-like flexible coupling means 404 between the card 400 and the electronic wallet 402, provides an electrical coupling means for electrically coupling the conductor 408 with the driver circuit 409 and for electrically coupling the sensor 214 with the controller 416. Alternatively, the flex circuit comprises other components in addition to the hinge. The power source 418 residing in the electronic wallet 402 comprises similar elements to those already discussed for power source 210 in FIG. 2. A larger battery optionally combined with a capacitor are incorporated into the electronic wallet 402 to help power both the functions of the electronic wallet 402 and the operation of the card 400.

The controller 416 is electrically coupled to a user interface 428 for communicating with the user of the electronic wallet 402. The user interface 428 comprises, in the preferred embodiment, a display (not shown), e.g., a liquid crystal display, for displaying information to the user. The user interface 428 also includes a user input means (not shown), such as buttons, switches, keys, or other contact input means for accepting input from the user. Additionally, the user interface 428 preferably comprises a user alerting means (not shown), e.g., an alert transducer for generating an audible alert, a light emitting diode or a lamp for providing visual indication, or a vibrator transducer for providing a tactile alert to the user, or a combination of the aforementioned output indicators.

In the preferred embodiment, the electronic wallet 402 comprises a wireless communication interface 419 capable of communicating messages with a remotely located communication device. The wireless communication interface includes a wireless communication receiver. The operation of the wireless communication interface is well known in the art and is described more fully in U.S. Pat. No. 5,124,697 entitled Acknowledge Back Pager, issued, Jun. 23, 1992, to Moore; U.S. Pat. No. 5,153,582 entitled Method and Apparatus for Acknowledging and Answering a Paging Signal, issued, Oct. 6, 1992, to Davis; and U.S. Pat. No. 4,875,038 entitled Frequency Division Multiplexed Acknowledge Back Paging System, issued, Oct. 17, 1989, to Siwiak et al., which are assigned to the assignee of the present invention and which are hereby fully incorporated herein by reference. The invention preferably operates with the Motorola ReFLEX® two-way wireless paging protocol described in detail in the following U.S. patent applications assigned to the assignee of the present invention: U.S. Pat. No. 5,475,863 entitled Method and Apparatus for Identifying a Transmitter in a Radio Communication System, issued Dec. 12, 1995 to Simpson et al.; U.S. Pat. No. 5,712,624 entitled Method and Apparatus for Optimizing Receiver Synchronization in a Radio Communication System, issued Jan. 27, 1998 to Ayerst et al.; U.S. Pat. No. 5,521,926 entitled Method and Apparatus for Improved Message Reception at a Fixed System Receiver, issued May 28, 1996 to Ayerst et al.; U.S. Pat. No. 5,638,369 entitled Method and Apparatus for Inbound Channel Selection in a Communication System, issued Jun. 10, 1997 to Ayerst et al.; and U.S. Pat. No. 5,737,691 entitled A System and Method for Allocating Frequency Channels in a Two-way Messaging Network, issued Apr. 7, 1998 to Wang et al., which are hereby fully incorporated by reference herein. It should be appreciated that other communication protocols are also contemplated, such as the Motorola Flex™ one-way wireless paging protocol described in U.S. Pat. No. 5,168,493 entitled Time Division Multiplex Selective Call System issued Dec. 1, 1992 to Nelson et al., assigned to the assignee of the present invention, and which is hereby fully incorporated by reference herein. As shown in FIG. 4, the electronic wallet 402 comprises an antenna 420 electrically coupled to a receiver circuit 422 that is electrically coupled to a decoder circuit 424 for selectively receiving and decoding messages transmitted by a remote device in a manner well known in the art. Typically, the messages comprise address information and message data. When the address information of a message being received matches a predetermined address information for the electronic wallet 402, the decoder circuit 424 determines that the message is destined for reception by the electronic wallet 402. Consequently, the decoder circuit 424 decodes the message being received, including the message data. The decoder circuit 424 is electrically coupled to the controller 416 for providing the received and decoded messages to the controller 416. Although a receiver circuit is shown in FIG. 4, a transmitter is alternatively included in order to implement two-way wireless communication.

In first alternative embodiment, the wireless communication interface 419 comprises an infrared communication means capable of communicating with a remotely located device utilizing infrared communication, preferably utilizing a standard set forth by the Infrared Data Association, in a manner well known in the art. In a second alternative embodiment, the wireless communication interface 419 comprises an ultrasound communication means for communicating with a remotely located device utilizing ultrasound communication. In a third alternative, the wireless communication interface 419 comprises a two-way radio frequency (RF) communication means capable of communicating with a remotely located device utilizing two-way RF communication. In a fourth alternative, the wireless communication interface 419 comprises a satellite communication means for communicating with a remotely located device utilizing satellite communication. Other alternative wireless communication means can be utilized by the wireless communication interface 419 within the spirit of the present invention.

For example, another device can transmit a message to the electronic wallet 402 via a wireless communication media, such via an RF communication channel. The antenna 420, in this example, receives a transmitted signal comprising the messages and couples the received signal to the receiver circuit 422. The receiver circuit 422 receives the signal and demodulates the data signal from the received RF signal. The decoder circuit 424 then decodes the data signal and extracts a message from the data signal. The decoder circuit 424 couples the message to the controller 416. In this way, a remote device can transmit commands, or data, or both, to the electronic wallet 402 and to the card 400.

The controller 416 can be remotely configured by transmitting messages to the electronic wallet 402. The electronic wallet 402 can be configured, for example, to store a data signal in a memory (not shown) to represent a subscription membership to a particular financial service. This would be analogous to an issuer of a financial card issuing a new card to the user. However, instead of delivering a tangible card to the user to begin a subscription to the service, the service provider only has to deliver the card information to the user's electronic wallet 402. The delivery of information to the user is preferably done by delivering a message to the electronic wallet 402 via the wireless communication interface 419. As an alternative, the information is communicated to the electronic wallet 402 via a communication between the card 400 and a magnetic card reader 100, such as when the card 400 has been inserted 406 into the slotted portion 104 of the magnetic card reader 100. In a third alternative, the information is provided to the user, such as via a writing, a display, or other delivery means, and then the user can enter the information into the electronic wallet 402 via the user interface 428.

Although not shown in the drawing, the wireless communication interface 419 is alternatively carried by the card 200, rather than by the electronic wallet, and such card is capable of being reconfigured over-the-air via the wireless communication interface 419 without involving use of the electronic wallet 402 during reconfiguation.

After the electronic wallet 402 has been configured as discussed above, in one embodiment, the user can select, via the user interface 428, a transaction using the subscription of a particular financial service provider. Then, the user can insert the card 400 into the slotted portion 104 of the magnetic card reader 100 to initiate a transaction that uses the particular financial service provider to authorize the transaction. This would be analogous to the user selecting the particular financial card from a conventional (i.e., non-electronic) wallet and swiping the card through the slotted portion 104 of the magnetic card reader 100. However, by using the card 400 and electronic wallet 402 arrangement of the present invention, the user has significant advantages over the conventional magnetic stripe card approach. First, the initiation of the transaction is more secure because the electronic wallet 402 requires a password to be entered by the user at the user interface 428 before a transaction could be effected. On the other hand, a conventional magnetic stripe card could be easily duplicated without the user's permission. Second, the electronic wallet 402 can store many different service provider identification and subscription information in a memory (not shown), such as in a memory at the controller 416 which can advantageously be configured via wireless communication through the use of the wireless communication interface 419. In this way, the user of the electronic wallet 402 can utilize the card 400 to initiate a transaction with a selected one of the many different service providers and subscription services identified in the controller 416. On the other hand, a user of the conventional magnetic stripe card typically keeps one magnetic stripe card for each service provider in a conventional wallet to be carried on the user's person. This is a bulky and cumbersome burden that users have had to tolerate in the past. This is especially burdensome if a user wants to engage in transactions with many different service providers. Third, the card 400 comprising the conductor 408 is a much more durable and reliable medium for initiating transactions with the magnetic card reader 100. With the invention, there are no problems with losing magnetic quality of the magnetic stripe 110 on a card 106 (see FIG. 1). The conductor 408 can be embedded deeply into the card 400 thereby protecting the conductor 408 from the external elements and physical damage. On the other hand, the conventional magnetic stripe 110 typically resides near the outer surface of the conventional magnetic stripe card and can be very susceptible to physical damage or external hazards.

Figure 5:
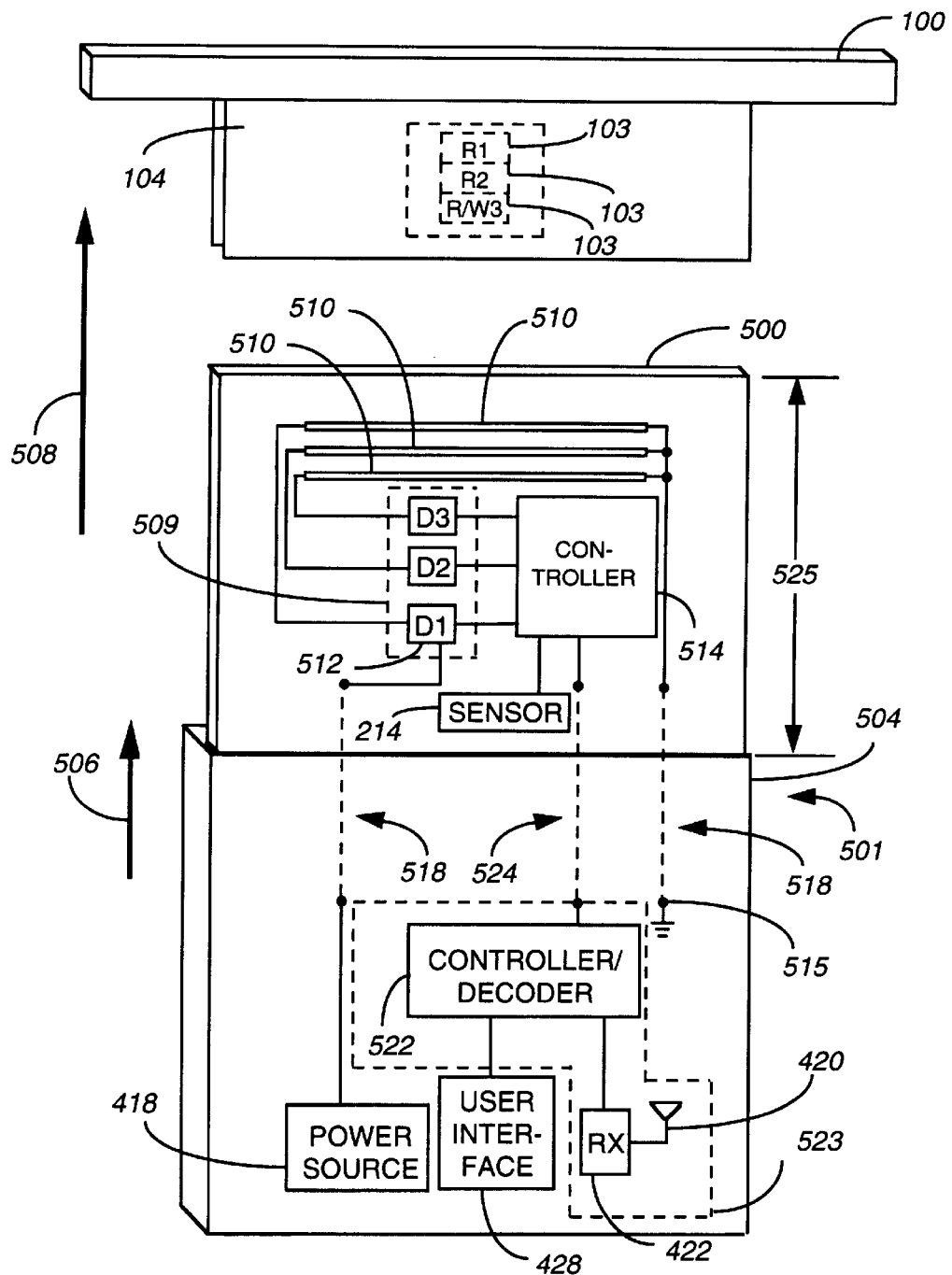
FIG. 5 is a simplified diagrammatic representation of an electronic wallet, of a magnetically communicative card removably connected to the electronic wallet in accordance with the invention, and of a conventional magnetic stripe card reader.

Referring to FIG. 5, a second alternative embodiment of a magnetically communicative card 500 and electronic wallet 502 apparatus 501 is shown according to the preferred embodiment of the present invention. The magnetically communicative card, or card, 500 comprises a controller 514 electrically coupled to at least one driver circuit 509 that is electrically coupled to at least one conductor 510. In this second alternative embodiment, the card 500 mechanically engages with the electronic wallet 502, but can be separated from the electronic wallet 502. For example, the card 500 can reside within a pocket 504 of the electronic wallet 502. The card 500 can be pulled out, in a direction indicated by arrow 506, from the pocket 504 to initiate a transaction with another device. The card 500 and the electronic wallet 502 are electrically coupled via slidable engagement contacts as will be more fully discussed below. While the card 500 and the electronic wallet 502 are slidably engaged, a controller/decoder 522 in the electronic wallet 502 can communicate via a sliding engagement means 524 with the controller 514 in the card 500. Additionally, a power source 418 provides power to the circuits on the card 500 through a slidable engagement means 518. In this way, the card 500, when slidably engaged with the electronic wallet 502, communicates therebetween and, for example, can be configured by the electronic wallet 502. That is, the controller/decoder 522 can communicate a data signal to the controller 514 on the card 500 to program a memory (not shown) in the controller 514. The controller/decoder 522 on the electronic wallet 502 can communicate with a remote device via the wireless communication interface 523 to, for example, receive messages. These messages, once received by the controller/decoder 522 includes commands or data, or both, to instruct the controller/decoder 522 to configure the controller 514 in the card 500. In this way, for example, a message transmitted by a remote device can be delivered to the wireless communication interface 523 and can reconfigure a card 500 to allow the user to initiate transactions with a service provider.

Therefore, the card 500 is configured remotely with the magnetic card reader 100 to initiate transactions with many different service providers that are identified and a subscription identification is stored in a memory in the controller 514 in the card 500. The delivery of information to the user is preferably done by delivering a message to the electronic wallet 502 via the wireless communication interface 523. As an alternative, the information is communicated to the electronic wallet 502 via a communication between the card 500 and a magnetic card reader 100, such as when the card 500 has been inserted into the slotted portion 104 of the magnetic card reader 100. In a third alternative, the information is provided to the user, such as via a writing, a display, or other delivery means, and then the user can enter the information into the electronic wallet 502 via the user interface 428.

A user, in one preferred mode of operation, partially disengages the card 500 from the electronic wallet 502 by pulling out, in the direction indicated by arrow 506, a portion of the card 500 from the pocket 504. With an edge portion of the card 500 being exposed outside the pocket 504 of the electronic wallet 502, the user inserts the edge portion of the card 500 into the slotted portion 104 of the magnetic card reader 100. The conductor 510 is then located in the slotted portion 104 to allow communication of information between the conductor 510 and the at least one magnetic reading head 103 of the magnetic card reader 100.

The user interface 428, as has been discussed above with respect to FIG. 4, is alternatively included in the electronic wallet 502 to provide output signals or display information to the user, and to provide means for the user to enter user input into the electronic wallet 502. It is evident that the card 500 can also include a user interface (not shown in FIG. 5), such as the user interface 212 shown in FIG. 2 and discussed with respect thereto. The user can access the functions of the card 500, for example, either via the user interface 428 of the electronic wallet 502, or a user interface (not shown) of the card 500, or a combination of both.

The sensor 214, as has been discussed above, is alternatively included in the card 500 to allow the controller 514 to affirmatively determine when the card 500 has been inserted into the slotted portion 104 of the magnetic card reader 100, at which time the controller 514 can begin providing a data signal to the driver circuit 512 to electrically drive the conductor 510 to communicate with the magnetic reading head 103.

Now referring to FIG. 6 and to FIG. 5, a slidable engagement means of the preferred embodiment will be more fully discussed below. The card 500 comprises, in this embodiment, a first flat contact 606 and a second flat contact 608. The electronic wallet 502 comprises a first flexible contact 602 and a second flexible contact (not shown). The first flexible contact 602 is electrically coupled to the power source 418 and the second flexible contact is electrically coupled to a ground reference return 515 for the power source 418. The first flexible contact 602 and the second flexible contact are electronically coupled to the first flat contact 606 and the second flat contact 608, respectively, via a sliding engagement means 518. When the card 500 is pulled out (up to a predetermined distance 525 indicated on FIG. 5) of the electronic wallet 502, the first flexible contact 602 maintains electronic contact with the first flat contact 606, and the second flexible contact maintains electrical contact with the second flat contact 608. The slidable engagement means 518 is used to couple the power source 418 in the electronic wallet 502 to electronic circuits in the card 500. Another slidable engagement means 524, shown in FIG. 5, comprising a third flexible contact (not shown) and a third contact (not shown) on the magnetically card provides an electrical path for other signaling between the electronic wallet 502 and the card 500. For example, the controller/decoder 522 can communicate signals with the controller 514 via the other slidable engagement means.

Figure 6:
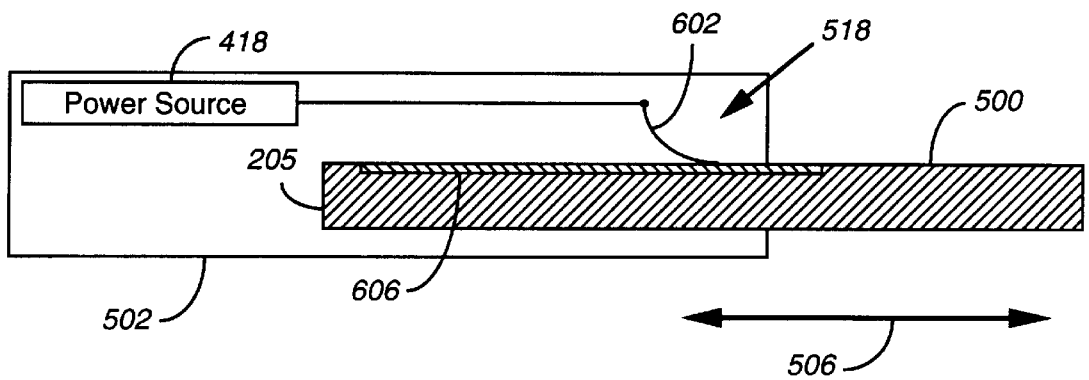
FIG. 6 is a cross-sectional view of the magnetically communicative card shown in FIG. 5.
Figure 7:
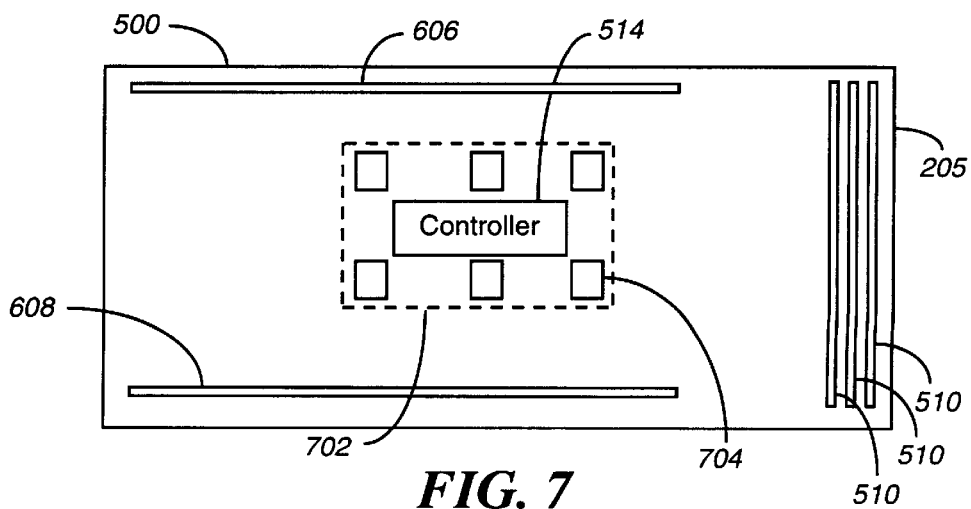
FIG. 7 is a plan view of the magnetically communicative card showing smartcard technology within the magnetically communicative card in accordance with the invention.

Referring to FIG. 7, the card 500, also shown in FIG. 5 and FIG. 6, also comprises smartcard technology, according to a preferred embodiment of the present invention. As shown in FIG. 7, the card 500 typically comprises a plurality of electrical contacts, such as the electrical contact 704 shown, which are located in a predetermined orientation within a predetermined region 702 about the surface of the card 500. Each electrical contact 704 is used for communicating signals, or power, or both, between a smartcard reader (not shown) and the card 500 with the smartcard technology therein. The orientation, location, and use of the electrical contact 704 for the smartcard technology is defined by industry standards for the smartcard industry.

According to the preferred embodiment of the present invention, the card 500 also includes conductor 510 about an edge of the card 500 to allow communications with the magnetic card reader 100 as has been discussed above. The controller 514 is electrically coupled to the conductor 510 such as via the driver circuit 512, to electrically drive the conductor 510 to communicate with the magnetic card reader 100 via the magnetic reading head 103. As shown in FIG. 7, the first flat contact 606 and the second flat contact 608 provide an electrical path for coupling electrical power from the electronic wallet 502 to the card 500 thereby providing power to the circuits, including the controller 514, the driver circuit 512, the sensor 214, and the conductor 510, located in the card 500. Therefore, the card 500 can operate in either a smartcard mode, or in a magnetic stripe card mode, or both. In this way, the card 500 comprising smartcard technology is compatible with conventional magnetic card reader technology and with the more recent smartcard reader technology. This allows a graceful evolution, if desired, to the more modern smartcard infrastructure while remaining compatible with the existing magnetic card reader infrastructure.

This dual compatibility with both the more modern smartcard reader technology and the existing magnetic card reader technology allows the user of the card 500 the significant advantage of utilizing whichever type of card reader infrastructure is available at a particular location for engaging in a transaction. Further, the significant investment in the current magnetic card reader infrastructure and technology does not become obsolete while the industry gracefully evolves to the more modern smartcard reader and newer infrastructure. This provides a significant financial advantage to the establishments that have already invested in magnetic card reader technology.

Figure 8:
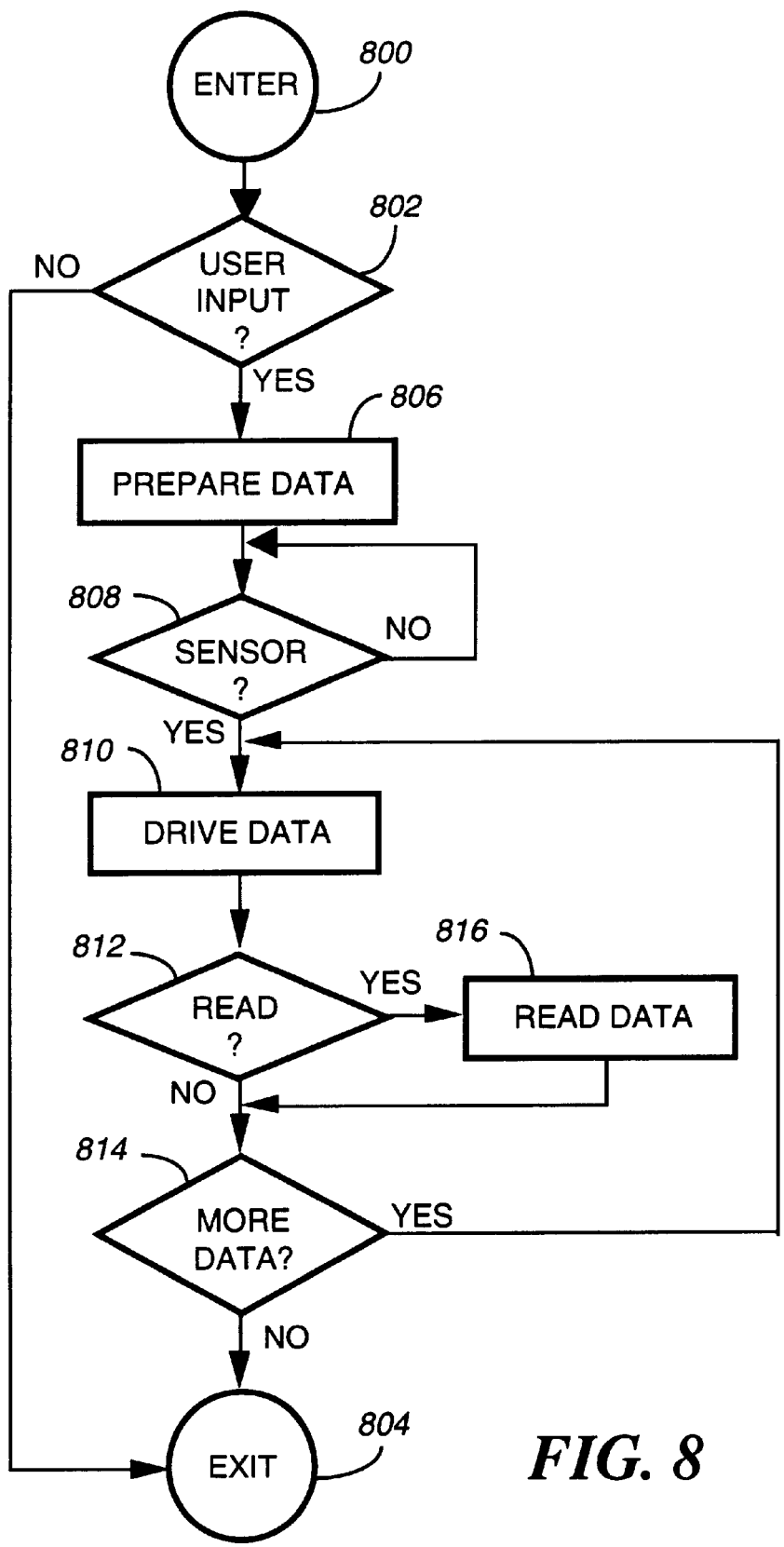
FIG. 8 is an exemplary operational sequence of an electronic wallet and of the magnetically communicative card in accordance with the invention.

Referring to FIG. 8, an exemplary operational sequence for the controller/decoder 522 of the electronic wallet 502 and for the controller 514 of the card 500, as shown in FIG. 5, FIG. 6, and FIG. 7, will now be discussed below. As has been discussed above with respect to FIG. 5, the controller 514 communicates with the controller/decoder 522 via the slidable engagement means 524 while the card 500 is at least partially inserted into the pocket 504 into the electronic wallet 502. The controller/decoder 522 enters the operational sequence, at step 800, and monitors for user input, at step 802, via the user interface 428. For example, the controller/decoder 522 displays on a display at the user interface 428 a prompt for the user to enter a password to begin operation of the electronic wallet 502. The controller/decoder 522 then monitors the user interface 428 to detect a user input, at step 802, such as via keys on a keyboard accessible to the user via the user interface 428. If no user input, or the wrong password is entered as user input, at step 802, the controller/decoder 522 then exits the operational sequence at step 804. On the other hand, if a correct password is entered by a user, at step 802, then the controller/decoder 522 either prompts a user to select a particular card, i.e., a particular service provider that issued a subscription to the user, in the event that a user has been issued more than one subscription for engaging in transactions using different services and service providers, or, alternatively, if the user has only one default subscription, then the controller/decoder 522 selects a particular service provider subscription for the user and communicates the selection with the controller 514 on the card 500. The controller 514 contains subscription identification information and related data in a memory preferably located in the controller 514. The controller 514, upon receiving a selection signal from the controller/decoder 522, prepares data, at step 806, for providing a data signal to the driver circuit 512 to electrically drive the conductor 510 in accordance with the data corresponding to the service provider subscription identification stored in the memory of the controller 514. Additionally, in the case of a financial transaction, the data prepared by the controller 514, at step 806, can include a transaction amount, such as may have been entered by a user via the user interface 428 and accepted by the controller/decoder 522 and then coupled to the controller 514 during the process of accepting user input, at step 802. The card 500 is now ready to be inserted, in a direction indicated by arrow 508, into the magnetic card reader 100. The controller 514 monitors the sensor 214, at step 808, to affirmatively determine when the card 500 has been inserted into the magnetic card reader 100.

When the sensor 214 couples a sensor signal to the controller 514 indicating that the card 500 is inserted in the slotted portion 104 of the magnetic card reader 100, at step 808, the controller 514 begins to provide the data signal to the driver circuit 512, at step 810, to electrically drive the conductor 510 in accordance with the data signal. After driving the data signal, at step 810, the controller 514 determines whether there is data to be read from the magnetic card reader 100, at step 812. This would be the case, for example, when an information service provider reprograms certain information at the card 500 utilizing the magnetic card reader 100. This is typically accomplished today with magnetic card readers 100 that are equipped with a read/write head mechanism for reading and writing to a third track in a conventional magnetic stripe card. However, the card 500 of the present invention, is also able to read data, at step 816, from the magnetic card reader 100. As has been discussed above with respect to FIG. 3, this entails, in one embodiment, the switching of a conductor 204 to be electrically coupled with either a driver circuit 304 or with a detector circuit 318, depending on whether the conductor is used to emit an exemplary alternating polarity magnetic field or the conductor is used to pick up a signal from an exemplary external alternating polarity magnetic field provided by the magnetic card reader 100. Therefore, while there is more data to be processed, at step 814, the controller 514 enters either the write data operational sequence, at step 810, or the read data operational sequence, at step 816, or both. After all the data has been processed, at step 814, the controller 514 then exits the operational sequence, at step 804. In this way, the electronic wallet 502 and the card 500 can communicate with the user and the magnetic card reader 100 to accept a transaction request from the user, including transaction parameters such as an amount, and then communicate with a magnetic card reader 100 to affect a transaction with a particular service provider that was selected by the user.

Figure 9:
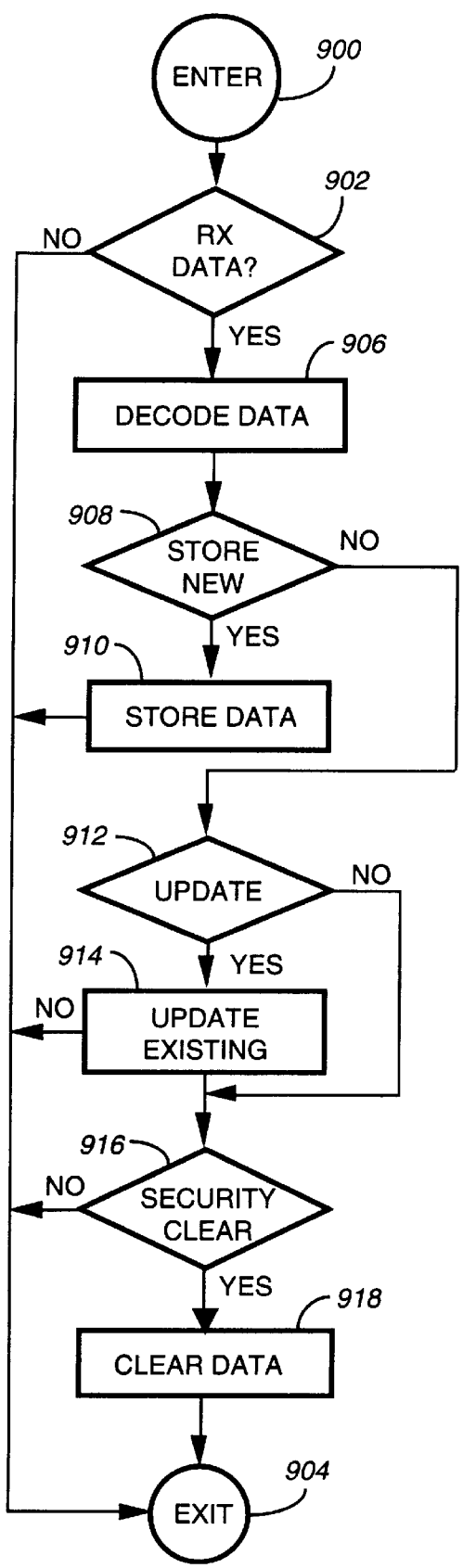
FIG. 9 is another exemplary operational sequence of an electronic wallet and of the magnetically communicative card in accordance with the invention.

Referring to FIG. 9, a second exemplary operational sequence is shown for the electronic wallet 502 and the card 500, according to a preferred embodiment of the present invention. The controller/decoder 522 periodically monitors the wireless communication interface 523, such as via the antenna 420 and receiver circuit 422 in a manner well known in the art. Upon detecting a message being received with address information selecting the particular electronic wallet 502, at step 902, the controller/decoder 522 then decodes the data from the message being received, at step 906. The data decoded from the message, at step 906, may include a command to the electronic wallet 502 and the card 500, as will be discussed below. If the controller/decoder 522 determines that the address of the message is not an address destined for reception by the electronic wallet 502, at step 902, the controller/decoder 522 exits the operational sequence at step 904.

First, the data may instruct the controller/decoder 522 to store a new entry into memory for a new subscription for the user, at step 908. When the controller/decoder 522 determines that a new data item is to be stored into memory, at step 908, the controller/decoder 522 stores the data in a memory located in the controller/decoder 522 and further communicates with the controller 514 and provides the data to the controller 514 which also stores the received data in a memory in the controller 514. This would store a new record in the data base for the controller/decoder 522 and in the controller 514 to allow the user to initiate transactions with the service provider corresponding to the subscription identification and data.

Secondly, the controller/decoder 522 may detect the command in the decoded data to update an existing record, at step 912. In such a case, the controller/decoder 522 updates the existing data base for the service provider at step 914, and further instructs the controller 514 to update its memory for the existing record for the service provider to correspond to the new received data.

As a third exemplary command, the controller/decoder 522 may detect a security clear command instructing the electronic wallet 502 and the card 500 to delete a particular record from the memory and from the database, at step 916. This occurs if a user of the electronic wallet 502 and the card 500 has terminated a subscription to a particular service provider. Of course, a user that has lost their electronic wallet 502 and card 500 can request a central service to transmit, at step 918, a security clear command to clear all data records and information from the database and memory in the controller/decoder 522 and the controller 514. In this way, a lost electronic wallet 502 and card 500 cannot be then used by an unauthorized user to initiate fraudulent transactions.

Figure 10:
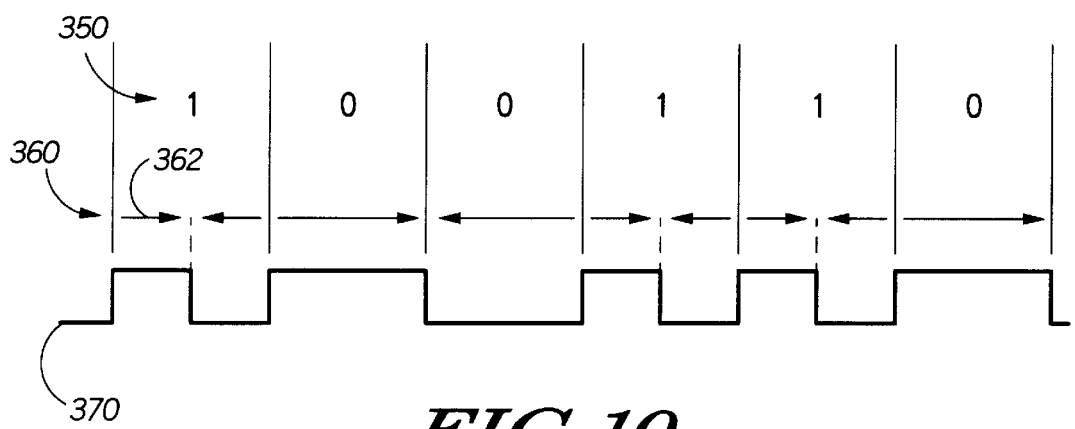
FIG. 10 is a graph of an exemplary data stream between a magnetic card reader and the magnetically communicative card in accordance with the invention.

Referring to FIG. 10, for example, a data stream 350, is shown being communicated to a prior art magnetic card reader 100 by either swiping through the slotted portion 104 a card 106 (see FIG. 1), or alternatively by operating the card 200 of the current invention in the slotted portion 104 of the magnetic card reader 100 (see FIG. 2 and FIG. 3).

The data stream 350 in this example comprises the data bits "100110". A series 360 of arrows represent a series of changing magnetic fields. The series of changing magnetic fields preferably communicates the data stream 350 utilizing a series of magnetic flux transitions. This would be analogous to passing a track of the at least one track 111 of information encoded in the magnetic stripe 110 in proximity to the magnetic reading head 103. Each arrow 362 represents a magnetic field change, such as a change in polarity or in magnitude. A change in direction of an arrow 362 represents a change in the magnetic field. In a preferred embodiment, a point in the series 360 at which the direction of the arrow 362 changes corresponds to a magnetic flux transition.

A data signal representing the data stream 350, in a preferred embodiment, comprises a self-clocking data signal represented by clock transition changes in direction of the arrow 362 at predetermined time intervals as illustrated in FIG. 10. Each "1" in the data stream 350 is represented by a change in direction of the arrow 362 in between clock transition changes in direction of the arrow 362. Each "0" in the data stream 350 is represented by an unchanged magnetic field (no change in direction of the arrow 362) in between clock transition changes in direction of the arrow 362. By providing a changing magnetic field, preferably exhibiting magnetic flux transitions, as illustrated by series 360, to the magnetic reading head 103, the data stream 350 is communicated to a magnetic card reader such as the prior art magnetic card reader 100. This is analogous, in one embodiment, to swiping the card 106 through the slotted portion 104 of the magnetic card reader 100 to pass the magnetic stripe 110 in proximity to the magnetic reading head 103.

Line 370 shows a changing current that can be driven through the conductor 204 of the present invention to causes the data stream 350 to be read by the magnetic reading head 103. In a preferred embodiment, a series of clock transitions are represented by a series of changes in a magnetic field at predetermined time intervals. This corresponds to changes in the current being driven through the conductor 204 at the predetermined time intervals.

For the magnetic reading head 103 to determine the presence of a "1", a change in the magnetic field, such as represented by a magnetic flux transition, occurs in between the changes in the magnetic field that represent the clock transitions occurring at the predetermined time intervals. This can be effected by changing the current being driven through the conductor 204 at a point in time in between the predetermined time interval when a "1" is to be communicated to the magnetic reading head 103. If a "0" is to be communicated to the magnetic reading head 103, the current being driven through the conductor 204 remains unchanged during the predetermined time interval thereby communicating a "0". Thus, in order to communicate the data stream 350, the current through conductor 204 is modulated in accordance with line 370. A "high" on line 370 indicates a first current while a "low" indicates a second current. For different implementations in accordance with the present invention, the second current can be less in value than the first current, or it can be a no value current, or it can be a negative value current.

Therefore, by electronically changing the magnetic fields about a conductor of the conductor 204 in a time variable manner, information is communicated to a magnetic card reader such as the prior art magnetic card reader 100. Since the magnetic fields change electronically, movement of the card of the present invention is not required, thereby saving wear and tear on both the card and the card reader. Nevertheless, since the conductor 204, in the preferred embodiment, runs substantially the width 201 of the card, the card of the present invention may still be "swiped" through a magnetic card reader. This allows users to perform the familiar "swiping" movement while using the card 200 of the present invention for users that have become accustomed to the "swiping" movement of the card 106. However, no "swiping" movement is necessary. Additionally, since the conductor 204 runs substantially the width of the card, the placement of the card along the "swipe" direction in the magnetic card reader is not critical for operation with the magnetic card reader 100 as long as a portion of the length of the card is inserted in the slotted portion 104 of the magnetic card reader 100. Consequently, communication of data by the card of the current invention is independent of movement of the card or placement of the card within the magnetic card reader. Further, the long track also provides for the present invention to work with magnetic card readers which have electromechanical mechanisms which automatically move the card through the magnetic card reader.

Thus, the card 500 of the present invention provides significant advantages to the user and to society over the conventional magnetic stripe card technology. Although conventional magnetic stripe cards are inherently limited in the amount of information that can be stored in the magnetic stripe 110, due in part to the ANSI standard and in part to the physical limitation of the magnetic media of the magnetic stripe 110, the card 500 of the present invention provides a much longer stream of data to a magnetic card reader 100. This alternative operation for a magnetic card reader 100 could be effected by reprogramming the magnetic card reader 100 to allow reading a much longer data stream from to a single track of a magnetic stripe card. One method for reprogramming a magnetic card reader 100 involves reprogramming an erasable programmable read only memory (EPROM) for the magnetic card reader 100. In an alternative method, a central system downloads commands over a communication link, such as a telephone link, to the magnetic card reader 100 to cause the magnetic card reader 100 to modify a parameter memory within the magnetic card reader 100. One of the parameters that would be modified at the magnetic card reader parameter memory would be the length of information that would be stored in a magnetic stripe card track. Once the magnetic card reader 100 has been configured to read a much longer track of information from a magnetically card, and the card 500 has also been configured to provide the much longer data stream, the card 500 provides to the magnetic card reader 100 a significantly larger amount of information than is possible with conventional magnetic stripe card technology. This much higher amount of information that can be communicated with the magnetically communicative card 500 is comparable to the amount of information that can be stored and communicated using smartcard technology. Therefore, the magnetically communicative card 500 performs well compared with smartcard technology, including the amount of information that is delivered between the magnetically communicative card 500 and the magnetic card reader 100.

Figure 11:
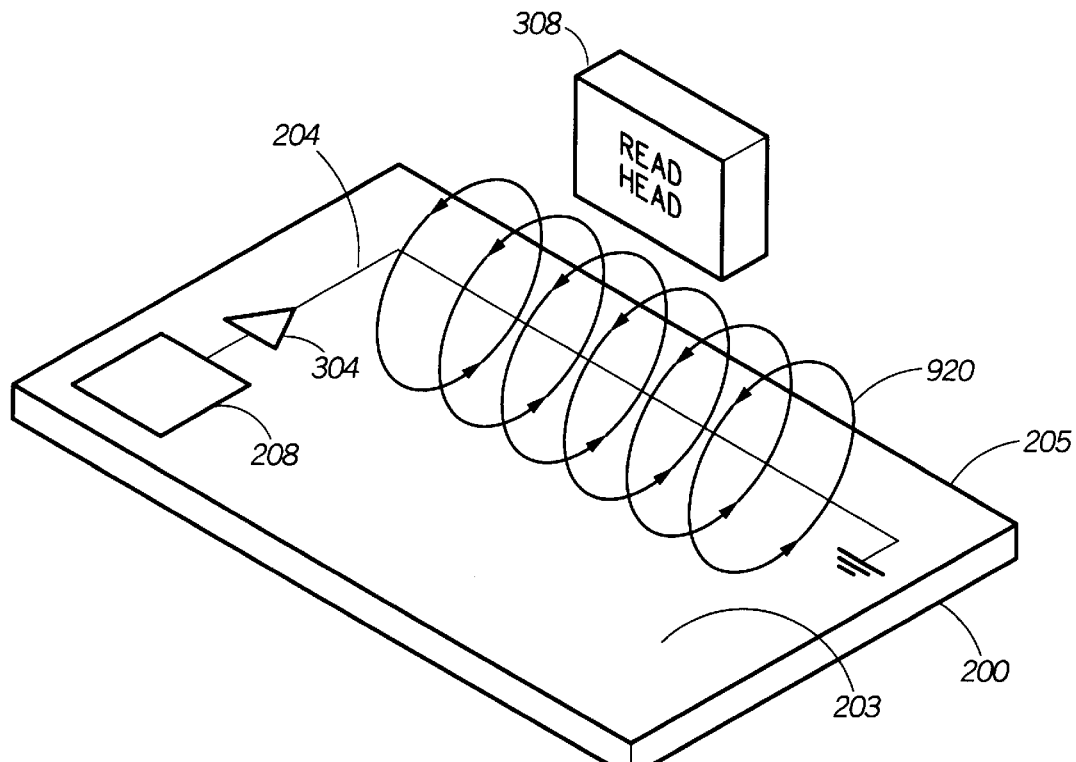
FIG. 11 is a perspective view of the magnetically communicative card and a read head of the conventional magnetic stripe card reader showing magnetic flux lines emanating from a ferrite core carried by the magnetically communicative card.
Figure 12:
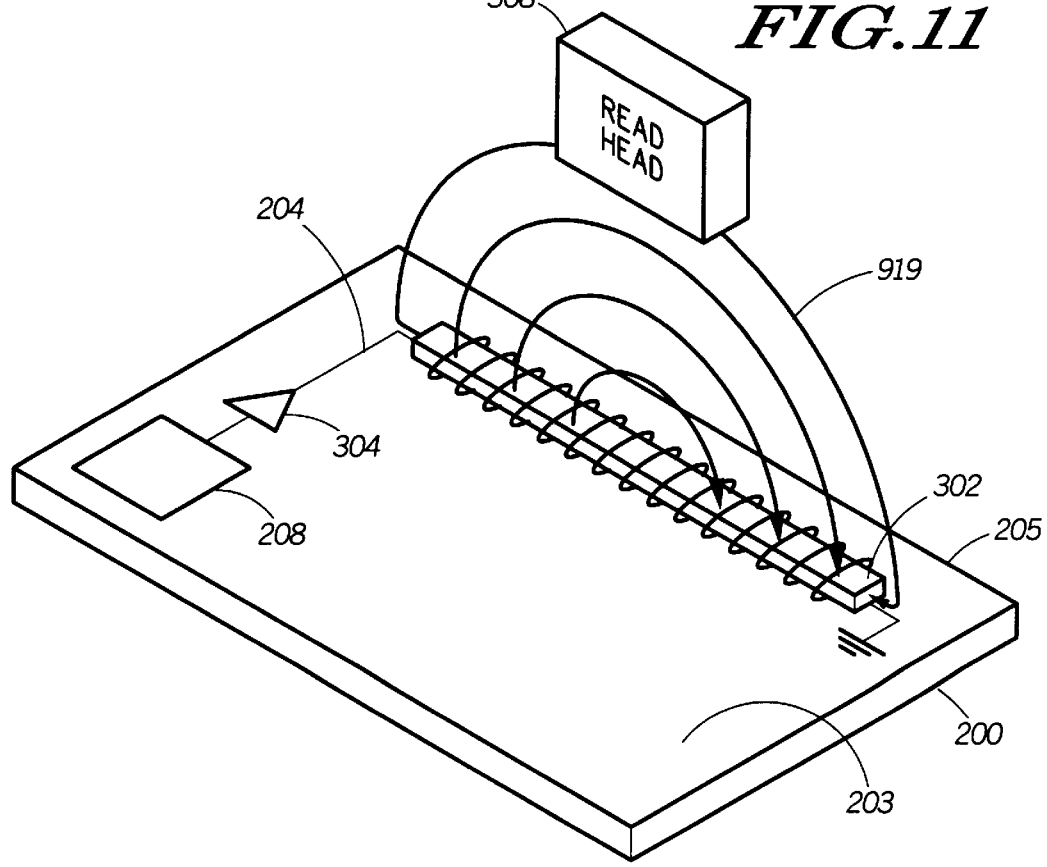
FIG. 12 is a perspective view of an alternative embodiment of the magnetically communicative card and a read head of the conventional magnetic stripe card reader showing magnetic flux lines emanating from a conductor carried by the magnetically communicative card.

Referring now to FIG. 11, the alternating polarity magnetic field as represented by magnetic flux lines 919 produced by the changing current through conductor 204 extend outwardly beyond a plane formed by the card 200 and are curved about the length of the ferrite core 302. Referring now to FIG. 12, in the alternative embodiment in which the conductor 204 is a straight conductor, the magnetic flux lines 920 produced by the changing current through conductor 204 also extend outwardly beyond a plane formed by the card, although it can be seen that the magnetic flux lines in FIG. 12 curve about the conductor 204 and run in another direction relative to the conventional position of a magnetic stripe than do the flux lines shown in FIG. 11.

While a detailed description of the preferred embodiments of the invention has been given, it should be appreciated that many variations can be made thereto without departing from the scope of the invention as set forth in the appended claims.

We claim:

1. A magnetically communicative card comprising:
   a card body having a width;
   a controller within the card body; and
   at least one conductor located at least partially within the card body, the at least one conductor being electrically coupled to the controller for controlling a magnetic field that alternates polarity with time emanating from the at least one conductor, the magnetic field being directly detectable by a magnetic card reader without further movement of the magnetically communicative card relative to the card reader, to magnetically communicate information from the magnetically communicative card to the magnetic card reader after the card body is at least partially inserted into the magnetic card reader.

2. The magnetically communicative card of claim 1 including a detector circuit coupled to the at least one conductor for detecting a signal produced in the at least one conductor in response a magnetic field emanating from a source external to the magnetically communicative card to magnetically communicate information to the magnetically communicative card.

3. The magnetically communicative card of claim 2 including more than one conductor and in which each conductor mimics a read/write track of a conventional magnetic stripe card.

4. The magnetically communicative card of claim 1 in which the card body includes a ferrite core having a length substantially identical to the length of the card body and in which the at least one conductor is wound about the ferrite core for entirely the length of the ferrite core.

5. The magnetically communicative card of claim 1 including a wireless communication receiver carried within the card body and coupled to the controller.

6. The magnetically communicative card of claim 5 in which the controller reconfigures the magnetically communicative card in response to signals received by the wireless communication receiver.

7. The magnetically communicative card of claim 6 in which the controller reconfigures the magnetically communicative card to mimic one of a plurality of conventional magnetic stripe cards.

8. The magnetically communicative card of claim 1, including a sensor coupled to the controller for sensing whether the magnetically communicative card is at least partially inserted into the magnetic card reader, and in which the magnetic field begins alternating polarity with time only after the magnetically communicative card is at least partially inserted into the magnetic card reader.

9. The magnetically communicative card of claim 8, in which the magnetically communicative card ends alternating polarity with time when the magnetically communicative card is no longer at least partially inserted into the magnetic card reader.

10. The magnetically communicative card of claim 1, including a sensor coupled to the controller for sensing whether the magnetically communicative card is at least partially inserted into the magnetic card reader, and in which the magnetic field alternates polarity with time only during a period that the magnetically communicative card is at least partially inserted into the magnetic card reader.

11. The magnetically communicative card of claim 1, including a detector circuit coupled to the controller for detecting whether the at least one conductor intercepts a changing magnetic field.

12. The magnetically communicative card of claim 1, including a driver circuit coupled to the controller for driving a changing current in the at least one conductor.

13. The magnetically communicative card of claim 1, including a detector circuit coupled to the controller for detecting whether the at least one conductor intercepts a changing magnetic field, a driver circuit coupled to the controller for driving a changing current in the at least one conductor, and a switch coupled to the controller for switching the at least one conductor between the detector circuit and the driver circuit.

14. The magnetically communicative card of claim 10, including a detector circuit coupled to the controller for detecting whether the at least one conductor intercepts a changing magnetic field, a driver circuit coupled to the controller for driving a changing current in the at least one conductor, and a switch coupled to the controller for switching the at least one conductor between the detector circuit and the driver circuit.

15. The magnetically communicative card of claim 11, including a sensor coupled to the controller for sensing whether the magnetically communicative card is at least partially inserted into the magnetic card reader, and in which the magnetic field alternates polarity with time only during a period that the magnetically communicative card is at least partially inserted into the magnetic card reader.

* * * * *